United States Patent
Hille et al.

(10) Patent No.: US 7,369,927 B2
(45) Date of Patent: May 6, 2008

(54) ACTIVE ROLLOVER PROTECTION UTILIZING STEERING ANGLE RATE MAP

(75) Inventors: Christian A. Hille, Auburn Hills, MI (US); Jeremy J. McClain, Auburn Hills, MI (US)

(73) Assignee: Continental Teves, Inc., Auburn Hills, MI (US)

( * ) Notice: Subject to any disclaimer, the term of this patent is extended or adjusted under 35 U.S.C. 154(b) by 603 days.

(21) Appl. No.: 10/817,243

(22) Filed: Apr. 2, 2004

(65) Prior Publication Data

US 2005/0222727 A1 Oct. 6, 2005

(51) Int. Cl.
*B60G 17/05* (2006.01)
*B60R 21/013* (2006.01)

(52) U.S. Cl. .................. 701/38; 340/440; 280/5.502

(58) Field of Classification Search ............ 701/36–38; 340/425.5, 429, 440; 280/5.502, 5.506, 5.51; 180/282

See application file for complete search history.

(56) References Cited

U.S. PATENT DOCUMENTS

| | | |
|---|---|---|
| 5,742,918 A | 4/1998 | Ashrafi et al. |
| 5,742,919 A | 4/1998 | Ashrafi et al. |
| 5,787,375 A | 7/1998 | Madau et al. |
| 5,790,966 A | 8/1998 | Madau et al. |
| 5,809,434 A | 9/1998 | Ashrafi et al. |
| 5,852,787 A | 12/1998 | Fodor et al. |
| 5,948,027 A | 9/1999 | Oliver, Jr. et al. |
| 5,971,503 A | 10/1999 | Joyce et al. |
| 6,122,568 A | 9/2000 | Madau et al. |
| 6,158,274 A | 12/2000 | Guo et al. |
| 6,169,939 B1 | 1/2001 | Raad et al. |
| 6,220,095 B1 | 4/2001 | Fennel et al. |
| 6,233,505 B1 | 5/2001 | Kranz et al. |
| 6,249,721 B1 | 6/2001 | Lohberg et al. |
| 6,263,261 B1 | 7/2001 | Brown et al. |
| 6,282,474 B1 | 8/2001 | Chou et al. |
| 6,324,446 B1 | 11/2001 | Brown et al. |
| 6,327,526 B1 | 12/2001 | Hagan |
| 6,330,496 B1 | 12/2001 | Latarnik et al. |
| 6,332,104 B1 | 12/2001 | Brown et al. |
| 6,338,012 B2 * | 1/2002 | Brown et al. .................. 701/1 |
| 6,347,541 B1 | 2/2002 | Maleki |
| 6,351,694 B1 | 2/2002 | Tseng et al. |
| 6,353,777 B1 | 3/2002 | Harmison et al. |
| 6,356,188 B1 | 3/2002 | Meyers et al. |
| 6,364,435 B1 | 4/2002 | Gronau et al. |
| 6,366,844 B1 | 4/2002 | Woywod et al. |
| 6,374,163 B1 | 4/2002 | Lou et al. |
| 6,397,127 B1 | 5/2002 | Meyers et al. |
| 6,409,286 B1 | 6/2002 | Fennel |

(Continued)

FOREIGN PATENT DOCUMENTS

WO        WO 97/47485        12/1997

(Continued)

*Primary Examiner*—Yonel Beaulieu

(57) ABSTRACT

An apparatus and method for protecting against rollover in a vehicle. The method and apparatus determine a rollover tendency of the vehicle based on the lateral acceleration, the vehicle speed and the change rate of the steering angle. A database of empiric data is preferably provided that includes values for a critical change rate of the steering angle corresponding to specific lateral accelerations in specific vehicle speeds. A critical change rate of the steering angle is determined based on the sensed lateral acceleration and vehicle speed.

17 Claims, 2 Drawing Sheets

U.S. PATENT DOCUMENTS

| | | |
|---|---|---|
| 6,424,907 B1 | 7/2002 | Rieth et al. |
| 6,434,451 B1 | 8/2002 | Lohberg et al. |
| 6,435,626 B1 | 8/2002 | Kostadina |
| 6,438,464 B1 | 8/2002 | Woywod et al. |
| 6,471,218 B1 | 10/2002 | Burdock et al. |
| 6,477,480 B1 | 11/2002 | Tseng et al. |
| 6,496,758 B2 | 12/2002 | Rhode et al. |
| 6,526,334 B1 | 2/2003 | Latarnik et al. |
| 6,526,342 B1 | 2/2003 | Burdock et al. |
| 6,529,803 B2 | 3/2003 | Meyers et al. |
| 6,554,293 B1 | 4/2003 | Fennel et al. |
| 6,556,908 B1 | 4/2003 | Lu et al. |
| 6,593,849 B2 | 7/2003 | Chubb et al. |
| 6,614,343 B1 | 9/2003 | Fennel et al. |
| 6,631,317 B2 | 10/2003 | Lu et al. |
| 6,654,674 B2 | 11/2003 | Lu et al. |
| 6,671,595 B2 | 12/2003 | Lu et al. |
| 2002/0139599 A1 | 10/2002 | Lu et al. |
| 2003/0065430 A1 | 4/2003 | Lu et al. |
| 2003/0100979 A1 | 5/2003 | Lu et al. |
| 2003/0130775 A1 | 7/2003 | Lu et al. |
| 2003/0130778 A1 | 7/2003 | Hrovat et al. |

FOREIGN PATENT DOCUMENTS

| | | |
|---|---|---|
| WO | WO 99/30941 | 6/1999 |
| WO | WO 99/30942 | 6/1999 |
| WO | WO 00/03887 | 1/2000 |
| WO | WO 00/03900 | 1/2000 |
| WO | WO 01/12483 A1 | 2/2001 |
| WO | WO 02/36401 A1 | 3/2002 |
| WO | WO 02/100696 A1 | 12/2002 |
| WO | WO 03/002392 A1 | 1/2003 |

\* cited by examiner

ACTIVE ROLLOVER PROTECTION UTILIZING STEERING ANGLE RATE MAP

FIELD OF THE INVENTION

The present invention relates generally to stability control systems for motor vehicles, and more particularly relates to active rollover protection for such stability control systems.

BACKGROUND OF THE INVENTION

In recent years, much attention has been paid to the reduction of rollover in motor vehicles, especially in larger vehicles such as sport-utility vehicles (SUV's) which have a relatively high center of gravity. These vehicles may experience friction induced rollover conditions, in which the vehicle can rollover in response to friction forces acting on the vehicle tires, without striking an obstacle. Vehicle rollover is caused by exceeding the critical roll angle for a particular vehicle. The roll angle is a function of the suspension of the vehicle, the vehicle's loading condition and other vehicle characteristics and dynamic conditions. For example, in a steady state driving condition the roll angle is proportionally related to the amount of lateral acceleration, the suspension tuning, and the dimensions of the vehicle (i.e. track width divided by the height of center of gravity). In transient maneuvers, the critical roll angle is somewhat variable and is determined by the additional factor of steering angle. In both cases, the roll angle behaves as a second order system to the input of lateral acceleration.

Existing rollover protection systems employ some form of a predictive means in an attempt to predict rollover and therefore prevent the same through corrective action such as vehicle braking, engine throttling or steering intervention. For example, some systems will directly monitor the roll rate or the roll acceleration in an effort to predict rollover. However, these systems do not take into account the primary cause of vehicle rollover, i.e. lateral acceleration. Other systems monitor the lateral acceleration in an effort to predict rollover. For example, some systems will monitor the change rate of the lateral acceleration as a predictor of vehicle rollover. Unfortunately, the change rate of lateral acceleration is not the best predictor of rollover and may only provide small period of time to take corrective action.

Accordingly, there exists a need to provide an active rollover protection system that prevents vehicle rollover utilizing a predictor that is both accurate and provides greater time to take corrective action to reduce the risk of vehicle rollover.

BRIEF SUMMARY OF THE INVENTION

One embodiment of the present invention provides a method for protecting against rollover in a vehicle comprising the steps of sensing a lateral acceleration, sensing a vehicle speed, sensing a change rate of the steering angle, and determining a rollover tendency of the vehicle based on the lateral acceleration, vehicle speed and change rate of the steering angle. The method also preferably includes the step of providing a database of empiric data that includes values for a critical change rate of the steering angle corresponding to specific lateral accelerations and specific vehicle speeds. A critical change rate of the steering angle is determined based on the sensed lateral acceleration and vehicle speed. The step of determining a rollover tendency includes comparing the change rate of the steering angle to the critical change rate of the steering angle.

According to more detailed aspects, a correction signal is generated based on the change rate of the steering angle and the critical change rate value. The correction signal is sent to an actuator for reducing rollover tendency. When the actuator is part of a steer-by-wire system (i.e. where the steering inputs from the driver are sent electrically to an actuator controlling the direction of the wheels), the driver input may be reduced so that the input never exceeds the critical change rate of the steering angle.

Another embodiment of the invention provides an active rollover protection system for a motor vehicle. The system includes a lateral acceleration sensor providing a first signal indicative of a lateral acceleration of the vehicle. A speed sensor provides a second signal indicative of a vehicle speed. A steering angle sensor provides a third signal indicative of a change rate of the steering angle. A data base is provided having critical change rate values corresponding to specific combinations of lateral acceleration and vehicle speed. A controller receives the first, second and third signals and determines a critical change rate value corresponding to the first and second signals. The controller compares the critical change rate value with the third signal to determine a rollover tendency.

According to more detailed aspects, the system may further include an actuator capable of reducing the rollover tendency. The controller sends a correction signal to the actuator indicative of the rollover tendency. The actuator may be a brake control system, an engine control unit, or an active steering system.

BRIEF DESCRIPTION OF THE DRAWINGS

The accompanying drawings incorporated in and forming a part of the specification illustrate several aspects of the present invention, and together with the description serve to explain the principles of the invention. In the drawings.

DETAILED DESCRIPTION OF THE INVENTION

Figure 1:
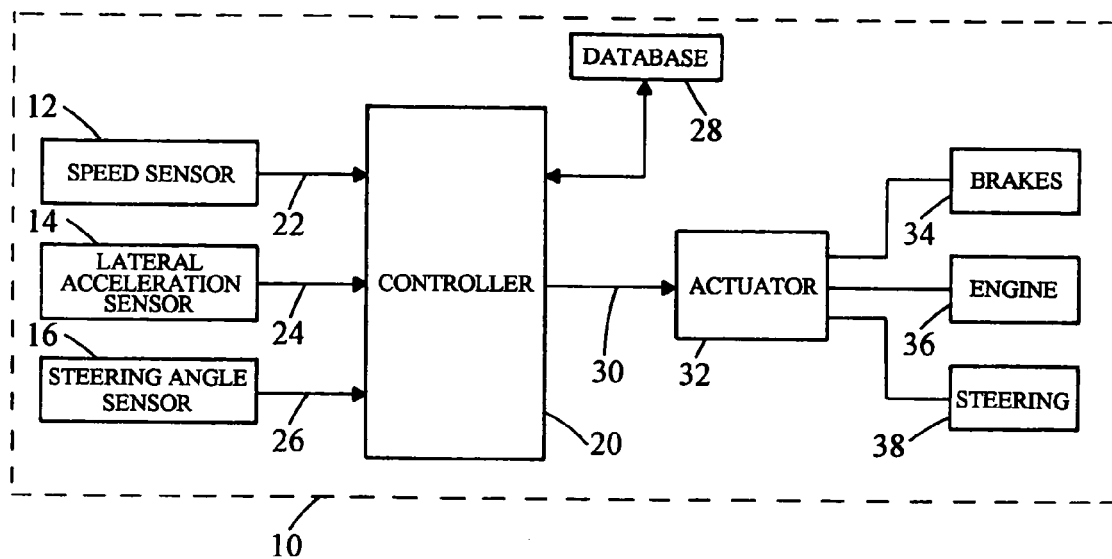
FIG. 1 is a schematic illustration of an embodiment of the active rollover protection system constructed in accordance with the teachings of the present invention.

Turning now to the figures, FIG. 1 depicts a schematic view of an active rollover protection system 10 which can form a portion of or be included in a stability control system for a motor vehicle (not shown). The active rollover protection system 10 includes a speed sensor 12, a lateral acceleration sensor 14 and a steering angle sensor 16. The speed sensor 12 detects vehicle speed and provides a signal 22 to the controller 20 indicative of vehicle speed. The speed sensor 12 may be of any type that is well known in the art, including individual wheel speed sensors. The lateral acceleration sensor 14 detects a lateral acceleration on the vehicle and sends a signal 24 indicative of lateral acceleration to the controller 20. The lateral acceleration sensor 14 may be of any type that is well known in the art, such as an accelerometer. It will be recognized that the vehicle speed and lateral acceleration may be interpolated or mathematically determined based on a variety of other sensors detecting vehicle conditions.

The steering angle sensor 16 detects the steering angle and the rate of change of the steering angle. The sensor 16 sends a signal 26 indicative of steering angle change rate to the controller 20. The controller 20 is in communication with a database 28 which contains a steering angle rate map (discussed in more detail herein with reference to FIG. 3) which includes stored values for a critical change rate of the steering angle. The controller 20 receives these signals 22, 24, 26 from the sensors 12, 14, 16, and based on a critical change rate of the steering angle retrieved from database 28, determines a rollover tendency of the vehicle.

If the rollover tendency reaches a critical limit, the controller 20 may send a control signal 30 to an actuator 32 for corrective action. The actuator 32 may take many forms, including a brake control system, an engine control unit, or an active steering system. A brake control system such as an active anti-lock braking system can be used to control brakes 34 to reduce a rollover moment and prevent the vehicle from exceeding the critical roll angle. Similarly, an engine control unit can regulate the throttle on the engine 36 to reduce torque and thereby reduce the rollover moment. An active steering system or steering control, as well as such systems as steer-by-wire systems, can control the steering 38, and specifically steering angle, to reduce the tendency for rollover and prevent the vehicle from exceeding the critical roll angle. It will be recognized that numerous other actuators may be employed, the actuators preferably being capable of reducing the rollover moment of the vehicle (i.e. active suspension systems, etc.).

As noted in the Background section above, rollover is a result of exceeding the critical roll angle, and roll angle behaves as a second order system to the input of lateral acceleration. Unfortunately, prior attempts to predict future roll angles or future lateral accelerations based on a roll rate or roll acceleration or rate of change of the lateral acceleration provide very little time to respond with corrective action. The present invention has recognized that since the system has to be predictive in order to activate the actuators early enough to prevent rollover, the change rate of lateral acceleration cannot be used. Rather, the present invention employs the change rate of the steering angle to allow the system to be predictive. As a vehicle turns a lateral acceleration is induced on the vehicle. This lateral acceleration causes a change in the roll angle, which in some situations can exceed a critical roll angle and rollover. Accordingly, the present invention identifies a critical change rate of the steering angle that leads to rollover based on current vehicle conditions such as the current lateral acceleration. The critical change rate of the steering angle, as used herein, refers to an identified change rate which is very likely to lead to vehicle rollover. The critical change rate of the steering angle is determined based on actual testing of a vehicle under various conditions, and the change rate values leading to rollover collected in a database 28.

Figure 2:
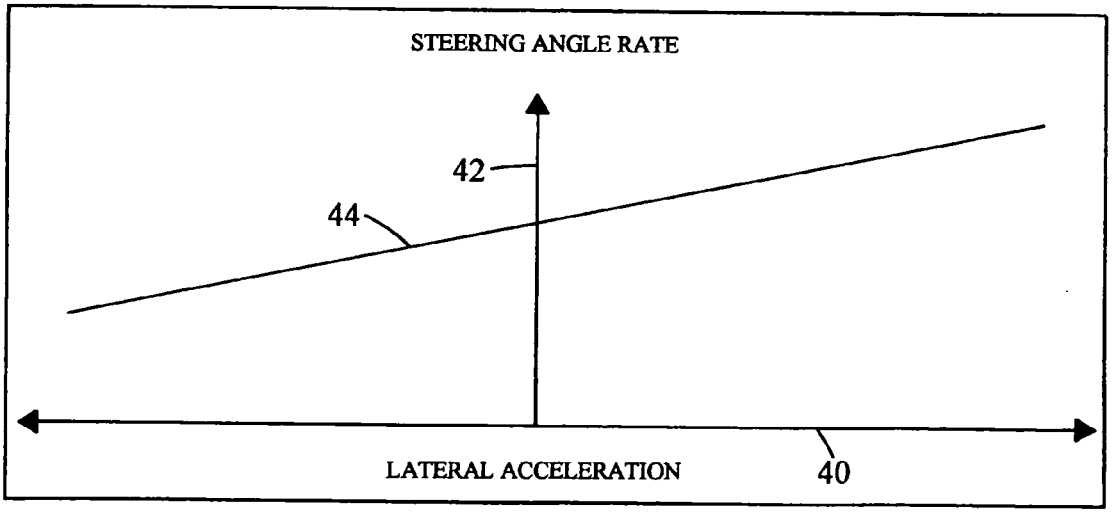
FIG. 2 is a graph showing the relationship between lateral acceleration and the critical steering angle rate.

The threshold for the change rate of steering angle is proportionally dependent on the lateral acceleration. With reference to FIG. 2, a graph is shown depicting lateral acceleration 40 on the X axis and the critical steering angle rate 42 on the Y axis. The sign of the lateral acceleration 40 is dependent on the direction or sign of the steering angle rate, and thus a positive lateral acceleration 40 is acting on a vehicle in the same direction as the steering angle is changing, while a negative lateral acceleration 40 refers to a lateral acceleration acting opposite the direction the steering angle is changing. Accordingly, for high positive lateral accelerations 40, the critical steering angle change rate 44 reaches its highest values. The critical steering angle change rate 44 becomes lower as the lateral acceleration 40 gets lower. For high negative lateral acceleration values 40, the critical steering angle change rate 44 reaches its lowest values.

Figure 3:
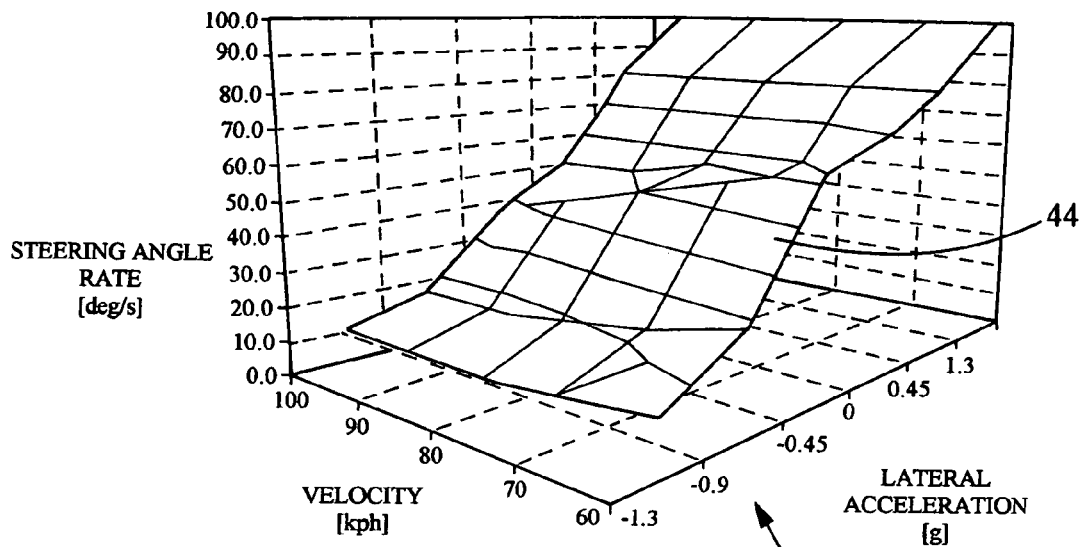
FIG. 3 is a graph depicting an example of a steering angle rate map for storage in the database depicted in FIG. 1.

The tendency for vehicle rollover is also dependent on the vehicle speed. Thus, the present invention employs a steering angle rate map which also utilizes vehicle speed. As is shown in FIG. 3, the critical steering angle change rate is determined based on the current lateral acceleration and the current vehicle speed. In this way, a set of values for critical change rate of the steering angle may be empirically determined for a vehicle, instead of change rate values corresponding to specific combinations of lateral acceleration and vehicle speed.

Figure 4:
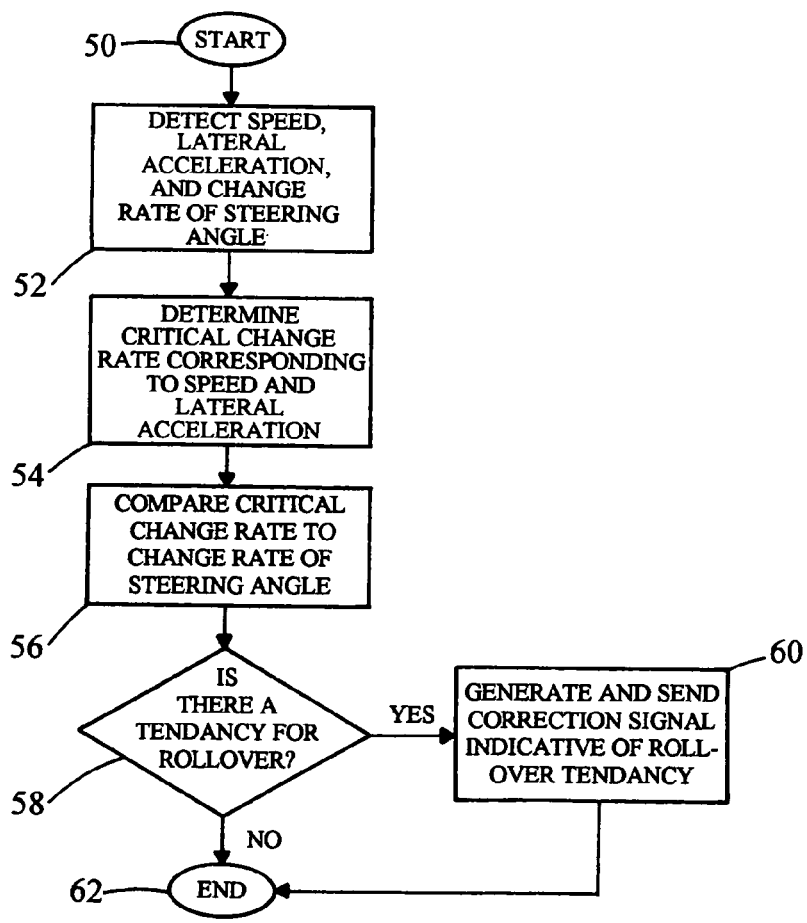
FIG. 4 is flow diagram depicting a method for preventing rollover utilizing the active rollover protection system depicted in FIG. 1.

Based on the steering angle rate map 46, a method for preventing rollover in a vehicle may be provided using the active rollover protection system 10 described above. With reference to FIG. 4, the method starts at step 50 and proceeds to detect the vehicle speed, the vehicle's lateral acceleration, and the change rate of the steering angle, as indicated at step 52. These values are determined from the speed sensor 12, lateral acceleration sensor 14 and steering angles 16 as described above. Based on the current vehicle speed and lateral acceleration, the controller 20 can communicate with database 28 to determine the critical change rate of the steering angle based on the rate map 46 stored in the database 28.

The method then compares the critical change rate to the change rate of steering angle detected by the sensor 16, as indicated at step 56. As shown in step 58, the controller 20 then determines whether there is a tendency for rollover based on the comparison in step 56. When the detected change rate of the steering angle is equal to or greater than the critical change rate, the method determines there is a tendency for rollover it will proceed to step 60.

When there is a tendency for rollover, the controller 20 will generate and send a correction signal indicative of the rollover tendency. For example, the controller 20 may compare the values for change rate and determine the amount or percentage by which the current change rate exceeds the critical change rate. That is, the more the change rate exceeds the critical change rate, the stronger the correction signal and the greater the corrective action will be. In this way, the correction signal is variable. When the current change rate of steering angle does not exceed the critical change rate, the method flows to its end at step 62.

It will therefore be recognized by those skilled in the art that the present invention provides an empiric solution to the differential equation for the rollover behavior of a vehicle. The differential equation is derived from a body model that includes linearizations and simplifications to allow an analytical solution. Since the invention provides an empiric solution to the equation, it implicitly models all of these nonlinearities. The utilization of the change rate of the steering angle allows the active rollover protection system 10 to quickly and accurately predict a tendency for a vehicle rollover and to provide sufficient time to allow the vehicle and the appropriate actuator 32 to respond and take corrective action to prevent rollover.

It will also be recognized that other vehicle control systems may employ the rollover protection provided by the present invention. For example, the critical change rate for a steering angle derived from the steering angle rate map could be utilized as a target value for a steer-by-wire system. Rather than allowing too high of an input and then trying to stabilize the vehicle (in terms of roll movement), the driver steering input could be reduced by the steer-by-wire system so it never exceeds the critical steering angle rate value.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A method for protecting against rollover in a vehicle comprising the steps of:
   sensing a lateral acceleration;
   sensing a vehicle speed;
   sensing a change rate of the steering angle;
   determining a critical change rate of the steering angle from a database having critical change rate values corresponding to specific combinations of lateral acceleration and vehicle speed;
   determining a rollover tendency of the vehicle based on the change rate of the steering angle relative to the lateral acceleration and vehicle speed; and
   reducing the rollover tendency of the vehicle.

2. The method of claim 1, wherein the database includes empiric data having values for critical change rates of the steering angle corresponding to specific lateral accelerations and specific vehicle speeds.

3. The method of claim 1, wherein the step of determining a rollover tendency includes comparing the change rate of the steering angle to the critical change rate of the steering angle.

4. The method of claim 1, wherein the critical change rate values are empirically determined for the vehicle.

5. The method of claim 1 wherein the step of reducing the rollover tendency includes generating a correction signal based on the change rate of the steering angle and the critical change rate value.

6. The method of claim 1, wherein the step of reducing the rollover tendency includes the steps of generating a correction signal indicative of rollover tendency and sending the correction signal to an actuator for reducing the rollover moment of the vehicle.

7. The method of claim 6, wherein the actuator is a steer-by-wire system, and wherein the steer-by-wire system reduces driver input so the input never exceeds a critical change rate of the steering angle.

8. The method of claim 6, wherein the correction signal has a variable strength.

9. The method of claim 5, wherein the correction signal is generated when the change rate of the steering angle is greater than the critical change rate value.

10. A method of protecting against rollover in a vehicle comprising the steps of:
    detecting a change rate of the steering angle;
    determining a critical change rate corresponding to the vehicle's current speed and the vehicle's current lateral acceleration;
    comparing the critical change rate to the detected change rate of the steering angle to determine a rollover tendency; and
    reducing the rollover tendency of the vehicle and generating a correction signal indicative of the rollover tendency and sending the correction signal to an actuator for reducing the rollover moment of the vehicle.

11. The method of claim 10, wherein the step of determining a critical change rate of the steering angle includes reading from a database having critical change rate values corresponding to specific combinations of lateral acceleration and vehicle speed.

12. An active rollover protection system for a motor vehicle comprising:
    a lateral acceleration sensor providing a first signal indicative of a lateral acceleration of the vehicle;
    a vehicle speed sensor providing a second signal indicative of a vehicle speed;
    a steering angle sensor providing a third signal indicative of a change rate of the steering angle;
    a database having critical change rates values corresponding to specific combinations of lateral acceleration and vehicle speed;
    a controller receiving the first, second and third signals, the controller determining the critical change rate value corresponding to the first and second signals, the controller comparing the critical change rate value with the third signal to determine a rollover tendency, the controller sending a signal; and
    an actuator capable of reducing the rollover tendency, the controller sending a correction signal to the actuator indicative of the rollover tendency.

13. The active rollover protection system of claim 12, wherein the actuator is a brake control system.

14. The active rollover protection system of claim 12, wherein the actuator is an engine control unit.

15. The active rollover protection system of claim 12, wherein the actuator is an active steering system.

16. The active rollover protection system of claim 12, wherein the actuator reduces the rollover moment of the vehicle.

17. The active rollover protection system of claim 12, the correction signal having a variable strength substantially proportional to a comparison between the critical change rate value and the change rate of the steering angle.

* * * * *